United States Patent
Tyercha et al.

(10) Patent No.: US 9,703,856 B2
(45) Date of Patent: Jul. 11, 2017

(54) HILBERT CURVE PARTITIONING FOR PARALLELIZATION OF DBSCAN

(71) Applicants: Edward-Robert Tyercha, Heidelberg (DE); Gerrit Simon Kazmaier, Heidelberg (DE); Hinnerk Gildhoff, Heidelberg (DE); Isil Pekel, Heidelberg (DE); Lars Volker, Karlsruhe (DE); Tim Grouisborn, Mannheim (DE)

(72) Inventors: Edward-Robert Tyercha, Heidelberg (DE); Gerrit Simon Kazmaier, Heidelberg (DE); Hinnerk Gildhoff, Heidelberg (DE); Isil Pekel, Heidelberg (DE); Lars Volker, Karlsruhe (DE); Tim Grouisborn, Mannheim (DE)

(73) Assignee: SAP SE, Walldorf (DE)

( * ) Notice: Subject to any disclaimer, the term of this patent is extended or adjusted under 35 U.S.C. 154(b) by 433 days.

(21) Appl. No.: 14/325,258

(22) Filed: Jul. 7, 2014

(65) Prior Publication Data

US 2016/0004762 A1     Jan. 7, 2016

(51) Int. Cl.
*G06F 17/30* (2006.01)

(52) U.S. Cl.
CPC .. *G06F 17/30598* (2013.01); *G06F 17/30315* (2013.01)

(58) Field of Classification Search
CPC ......... G06F 17/30598; G06F 17/30705; G06F 17/30707; G06F 17/3071; G06F 17/30713; G06K 9/6267–9/6285
See application file for complete search history.

(56) References Cited

U.S. PATENT DOCUMENTS

| | | | |
|---|---|---|---|
| 2001/0014181 A1* | 8/2001 | Craver | G06F 17/30 382/276 |
| 2003/0004938 A1* | 1/2003 | Lawder | G06F 17/30333 |
| 2004/0225638 A1* | 11/2004 | Geiselhart | G06F 17/3061 |
| 2007/0156634 A1* | 7/2007 | Martin | G06F 17/30592 |
| 2015/0046411 A1* | 2/2015 | Kazmaier | G06F 17/30336 707/693 |
| 2015/0370857 A1* | 12/2015 | Nica | G06F 17/30539 707/752 |
| 2016/0203173 A1* | 7/2016 | Zhang | G06F 17/30336 707/743 |

OTHER PUBLICATIONS

Jagadish, Hosagrahar V. "Linear clustering of objects with multiple attributes." In ACM SIGMOD Record, vol. 19, No. 2, pp. 332-342. ACM, 1990.*

(Continued)

*Primary Examiner* — Jason Liao
*Assistant Examiner* — Jesse P Frumkin
(74) *Attorney, Agent, or Firm* — Mintz Levin Cohn Ferris Glovsky and Popeo, P.C.

(57) ABSTRACT

DBSCAN clustering analyses can be improved by pre-processing of a data set using a Hilbert curve to intelligently identify the centers for initial partitional analysis by a partitional clustering algorithm such as CLARANS. Partitions output by the partitional clustering algorithm can be process by DBSCAN running in parallel before intermediate cluster results are merged.

11 Claims, 8 Drawing Sheets

(56) References Cited

OTHER PUBLICATIONS

Lawder, Jonathan K., and Peter J. H. King. "Querying multi-dimensional data indexed using the Hilbert space-filling curve." ACM . Sigmod Record 30, No. 1 (2001): 19-24.*

Moon, Bongki, Hosagrahar V. Jagadish, Christos Faloutsos, and Joel H. Saltz. "Analysis of the clustering properties of the Hilbert space-filling curve." IEEE Transactions on knowledge and data engineering 13, No. 1 (2001): 124-141.*

Xu, Xiaowei, Jochen Jäger, and Hans-Peter Kriegel. "A fast parallel clustering algorithm for large spatial databases." In High Performance Data Mining, pp. 263-290. Springer US, 1999.*

Xu, Pan, and Srikanta Tirthapura. "Optimality of clustering properties of space-filling curves." ACM Transactions on Database Systems (TODS) 39, No. 2 (2014): 10.*

Yang, Yiyang, and Zhiguo Gong. "Identifying Points of Interest Using Heterogeneous Features." ACM Transactions on Intelligent Systems and Technology (TIST) 5, No. 4 (2015): 68.*

Lu, Yun-Tai. "An Efficient Hilbert Curve-Based Clustering Strategy for Large Spatial Databases." PhD diss., National Sun Yat-sen University, 2003.*

Arbelaez, Alejandro, and Luis Quesada. "Parallelising the k-medoids clustering problem using space-partitioning." In Sixth Annual Symposium on Combinatorial Search. 2013.*

Ng, Raymond T., and Jiawei Han. "CLARANS: A method for clustering objects for spatial data mining." IEEE transactions on knowledge and data engineering 14, No. 5 (2002): 1003-1016.*

* cited by examiner

HILBERT CURVE PARTITIONING FOR PARALLELIZATION OF DBSCAN

TECHNICAL FIELD

The subject matter described herein relates to clustering analysis of data sets.

BACKGROUND

Cluster analysis or clustering is the task of grouping a set of data in such a way that data points in the same cluster (e.g. a group of data points) are more similar (in some sense or another) to each other than to those in other clusters. Cluster analysis is frequently employed in exploratory data mining, statistical data analysis, etc., and is useful in many fields.

In general, a cluster analysis (e.g. K-means, CLARANS, or the like) seeks to collect data points in a data set into similar groups. Depending on the clustering algorithm used, a group can be defined by the center of the group, for example a centroid or a mediod for a data set of n dimensions. In DBSCAN is assumed that all core points in a cluster are connected, so any point in a cluster can be a representative of its cluster.

Two examples of standalone clustering algorithms include CLARANS (Clustering Algorithm based on Randomized Search) and DBSCAN (Density-Based Spatial Clustering of Applications with Noise). CLARANS is a long running clustering algorithm that randomly searches the centers of the clusters (e.g. medoids or centroids) and (ideally) converges to a set at which point the algorithm terminates and produces the clusters. DBSCAN is a density based clustering algorithm based on the idea that a cluster should grow in any direction as long as the density of the elements remains over a certain threshold.

DBSCAN is a density-based clustering algorithm, which is especially useful in detecting arbitrary shaped clusters. The algorithm requires two parameters: a minimum number of points (MinPts) and epsilon (Eps). A key idea of DBSCAN is that the neighborhood of a point determined by Eps should contain a number of data points equal to or greater than MinPts so that it can populate or extend a cluster. Thus, in DBSCAN, the points are grouped into three types of points: core points, border points, and noise points, which can be defined as follows and in reference to the diagram 100 of FIG. 1. The Eps-neighborhood of a data point p in a data set, denoted by $N_{Eps}(p)$ can be defined by $$N_{Eps}(p)=\{q \in D | dist(p,q) \leq Eps\} \quad (1)$$

Figure 1:
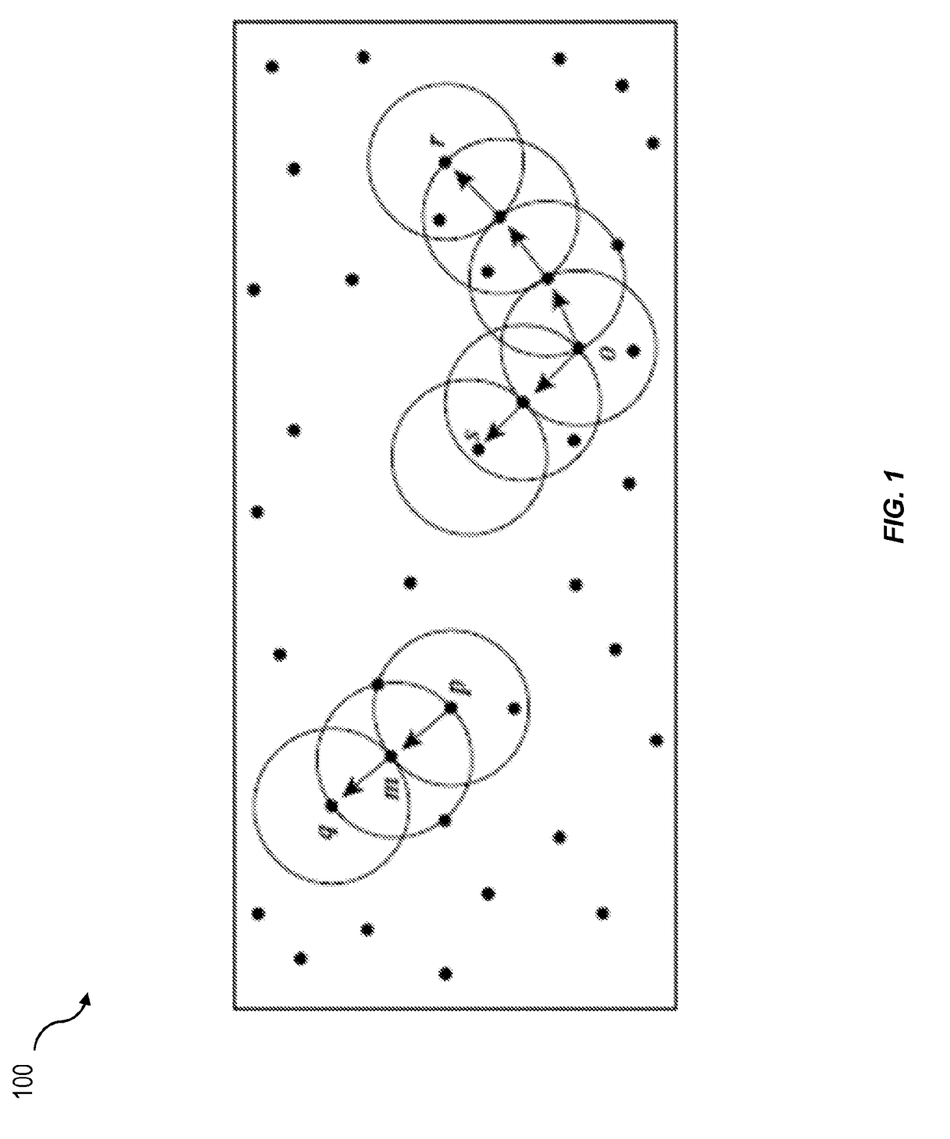
FIG. 1 shows a diagram illustrating features relating to DBSCAN parameters and definitions.

Based on this definition, a data point p is a core point when the following inequality holds:

$$|N(p)| \geq MinPts \quad (2)$$

In FIG. 1, m, p, o, and r are core points. A data point p is directly density reachable from a point q with respect to Eps and MinPts if the data point p qualifies as a core point per equation 2 and if the following relationship is also true:

$$p \in N_{Eps}(q) \quad (3)$$

In other words, the points in the Eps-neighborhood of a core point are directly density reachable from that core point. This relation is symmetric for two core points but not symmetric for a core point and a border point. In FIG. 1, q is directly density reachable from m.

A point p is density reachable from a point q with respect to Eps and MinPts if there is a chain of points $(p_1, \ldots, p_n)$, $p_1=q$, $p_n=p$ such that $p_{i+1}$ is directly density reachable from $p_i$. This relation is transitive and similar to directly density reachability, and is symmetric for two core points and non-symmetric for a core and a border point. In FIG. 1, q is directly reachable from p, but the inverse is not true because q is not a core object.

A point p is density connected from a point q with respect to Eps and MinPts if there is a point o such that both p and q are density reachable from o with respect to Eps and MinPts. This relation is symmetric. Points s, o, and r are density connected in FIG. 1.

A cluster C with respect to Eps and MinPts in a data set D is a non-empty subset of D satisfying both of maximality and connectivity. For maximality, the following relationship is generally satisfied: $\forall p,q$: if $p \in C$ and q is density-reachable from p with respect to Eps and MinPts, then $q \in C$. For connectivity: $\forall p,q \in C$: p is density-connected to q with respect to Eps and MinPts. According to this definition, a cluster is a set of density connected points which is maximal with respect to density reachability.

Noise is defined in DBSCAN as the set of points in a data set D not belonging to any cluster, where $C_1, C_2, \ldots, C_k$ are the clusters of the data set D with respect to parameters $Eps_i$ and $MinPts_i$. In other words, all points that do not belong to a cluster are noise points, and this n noise can be quantified as follows:

$$Noise=\{p \in D | \forall i: p \notin C_i\} \quad (4)$$

Advantages of DBSCAN can include the ability to detect arbitrarily shaped clusters, requiring little information about data, handling noise explicitly without requiring any other mechanism, and not requiring a hierarchical structure on data.

Using conventional index structures, the complexity of DBSCAN is generally on the order of the number of values squared (e.g. $O[n^2]$). Variations of DBSCAN in currently applied approaches can reduce the complexity of DBSCAN to $O(n*\log(n))$ by using hierarchical structures such as r-tree and b-tree. However, these structures are not typically used in column stores because they grow very fast with increasing size of the data set and do not easily support parallel access. Currently available solutions do not address application and optimization of DBSCAN or any other clustering algorithm in a column store environment.

While DBSCAN can typically give comparatively more efficient results than CLARANS, it can also require long running times on large data sets. DBSCAN is not parallelizable (e.g. across multiple parallel computing nodes) in its original definition, and it not readily parallelizable without some sort of preprocessing. For example, simply splitting a data set manually into some number of partitions and applying DBSCAN onto each partition can yield an undesirable result as merging of the resultant partial clusters (which could be produced by DBSCAN as a result of bad partitioning) can be difficult or in some cases impossible.

There are currently available approaches are available for making DBSCAN parallelizable. For example, an approach known as Enhanced DBSCAN (E-DBSCAN) combines CLARANS and DBSCAN. CLARANS is partitional. In general, partitional clustering algorithms groups the points into different sets and then in every following iteration it optimizes the previous set. In the end, the algorithm converges, albeit often with a large number of iterations, when further iteration no longer result in changes in the result. In E-DBSCAN, a few initial iterations in CLARANS are applied to the data to yield at least a semi optimal partitioning without creating an exact CLARANS result. DBSCAN is applied to the partitions given by CLARANS. This approach can improve performance by enabling parallel processing, for many data sets the results can be less than optimal while still largely acceptable. Partitioning of the data might prevent DBSCAN from calculating the neighborhood of a point properly, which cause the DBSCAN part of the analysis to also produce a semi optimal result too. The results of parallel processed DBSCAN analyses are checked to identify clusters which are split because of the parallelization. The goal is generally to merge such clusters in a manner that may yield a result that closely resembles what would be produced by a non-partitioned DBSCAN. The E-DBSCAN approach generally uses an "interconnectivity" property, which can be easily calculated and which does not require checking each and every point within each cluster. An E-DBSCAN process ends after the merge operation completes.

In E-DBSCAN, two clusters a and b can be merged if their relative inter-connectivity $N_{ab}$ exceeds a merging threshold $\alpha_{merge}$. The relative inter-connectivity is found by dividing the number of the edges that connect two clusters $N_{ab}$ by the sum of the edges that connect the points within these clusters, $N_a$ and $N_b$ respectively, which can be expressed as follows:

$$\frac{N_{ab}}{(N_a + N_b)/2} \geq \alpha_{merge} \quad (5)$$

Figure 2:
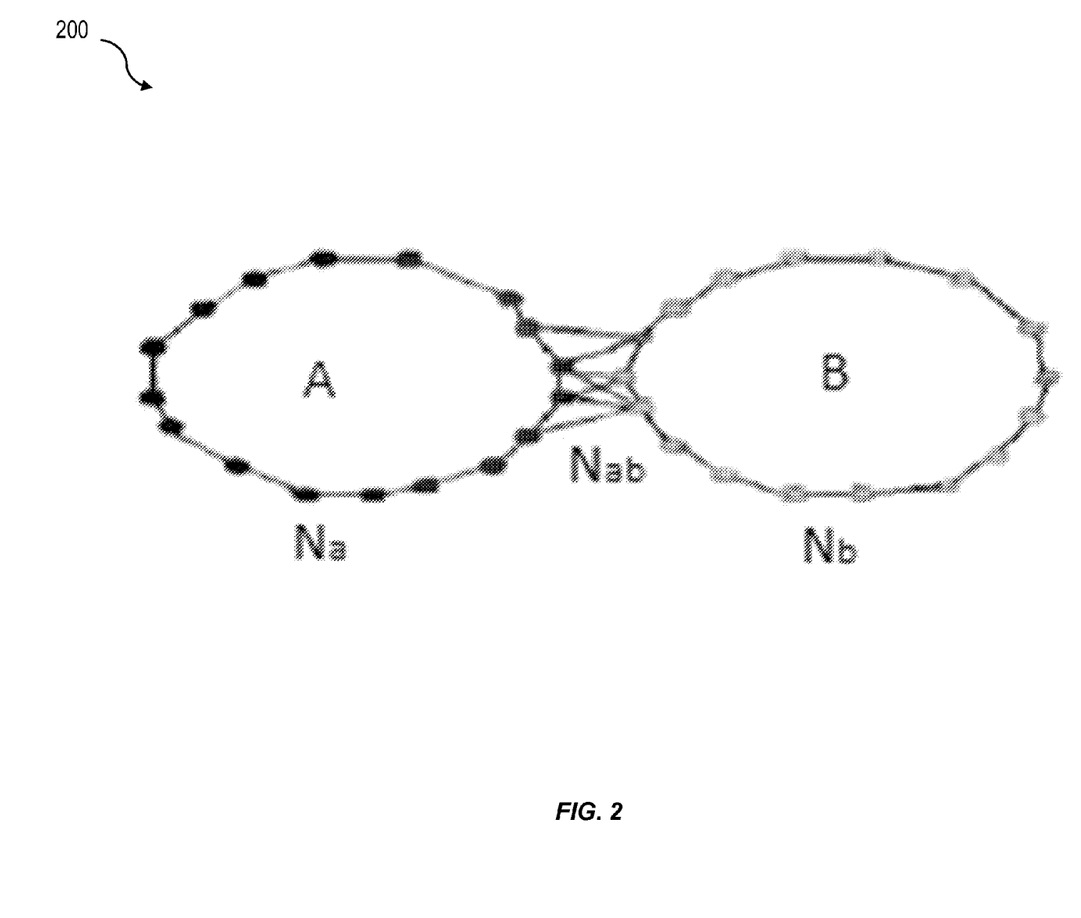
FIG. 2 shows a diagram illustrating inter-connectivity between clusters.

An E-DBSCAN process using this algorithm can be time-consuming if all points in a cluster are used to calculate the relative inter-connectivity. To reduce the overhead, only the border points, which are already extracted by DBSCAN, are used in calculations, thereby relying on the assumption assumes that there is an edge between two border points if their distance is less than Eps as illustrated in the diagram 200 of FIG. 2.

Since DBSCAN is applied to separate partitions, some border points might be labeled as noise by mistake. To correct their labels, all noise points can be checked for a core point in their Eps neighborhood in this step. If a core point is found, these points are assigned to the cluster of that core point. Despite its efficiency, there are several problems with this approach. Generally, determining an appropriate k requires knowledge about the distribution of data, which might not be available in large databases. Furthermore, CLARANS initializes the centroids randomly. An inappropriate choice in the beginning might increase the run time of the algorithm substantially. Additionally, the candidates to replace a center are also chosen randomly. In other words, all points, including the ones that are far away from the centers, have the same chance to be chosen, which causes a computational overhead.

SUMMARY

Various aspects of the current subject matter can advantageously provide approaches for improving performance of a DBSCAN analysis on a data set. The data set can be indexed using a Hilbert curve to identify long sequences within the data. Values characterizing the center (e.g. a mean, a median, etc.) of each identified long sequence in the Hilbert indices of the data set can be used as initial inputs to a partitional clustering algorithm, which can produce partitioned data. The partitions of the partitioned data can be processed in parallel using a DBSCAN algorithm that produces a set of intermediate results (e.g. one for each partition processed in parallel. The intermediate results can be merged to a final result.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Implementations of the current subject matter can include one or more features that can improve application of DBSCAN to column stored data. Improvements can be realized consistent with one or more aspects described herein by using a Hilbert curve as part of a pre-processing approach that assists the CLARANS algorithm in finding a good partitioning result even within very few iterations. Doing so can reduce the number of CLARANS iterations required to achieved a useful partitioning.

Hilbert curves (also referred to as Hilbert space-filling curves) are continuous fractal space-filling curves that provide a mapping between 1D and 2D (or 3D) space while reasonably preserving locality information about data points in a data set. A Hilbert curve traverses an area or space in a linear manner, and records for each data point in a data set the distance d from the beginning of the curve to when the curve encounters each data point. Data points having relatively similar values for the distance d can be assumed to be relatively close in the native coordinate system of the data set. For example, if a Cartesian coordinate system is used, two points having similar d values can be assumed to be close to one another in the (X,Y) or (X,Y,Z) Cartesian coordinate system.

A conventional E-DBSCAN approach generally involves CLARANS initializing a first set of cluster centers randomly. The number of centers to choose for initializing the clusters is typically based on some heuristic.

Figure 3:
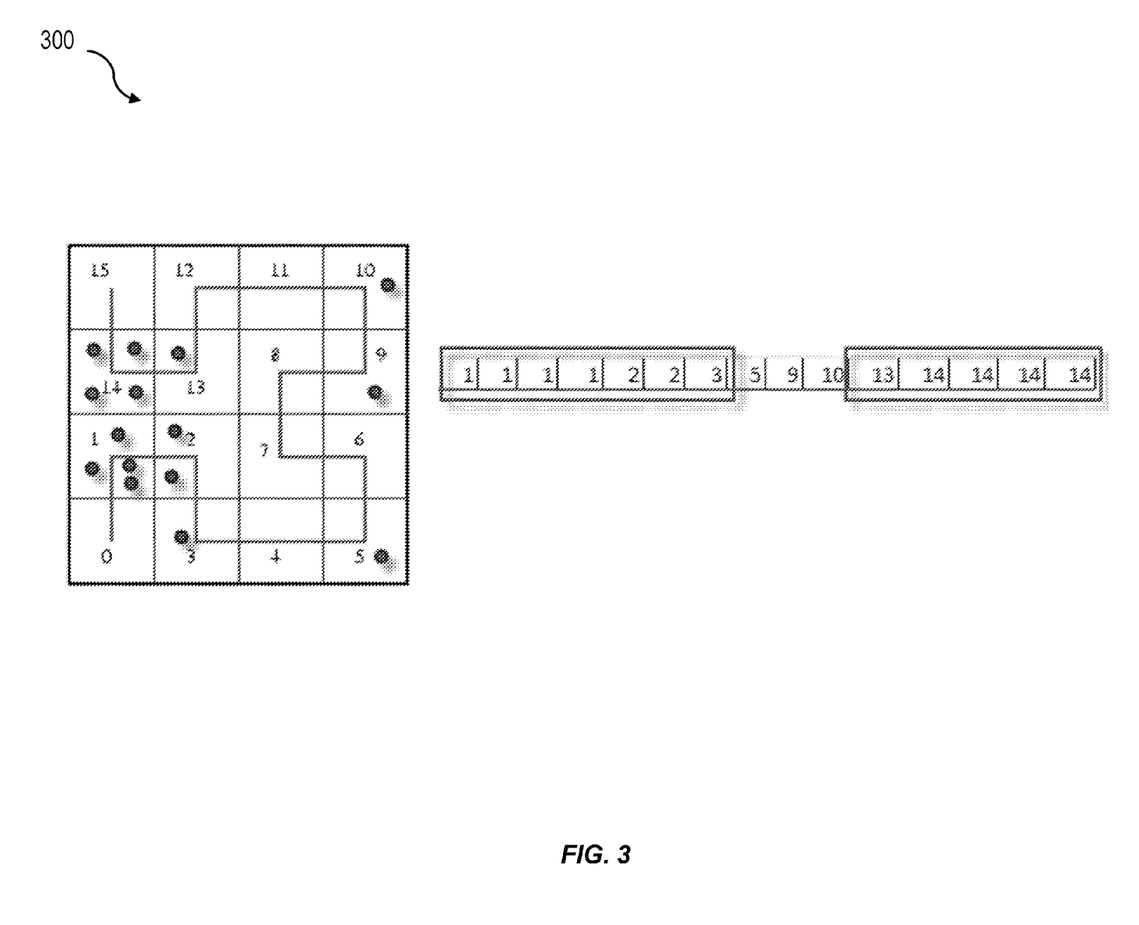
FIG. 3 shows a graph illustrating a Hilbert curve and a listing of Hilbert distances.

In contrast, consistent with implementations of the current subject matter, a pre-processing Hilbert indexing can be used to extract long sequences (e.g. based on Hilbert curve distances within some range of one another) of data points within the data set. The distance information derived from Hilbert curve indexing of the data points in a data set (e.g. using an uncompressed Hilbert curve) can be used for extracting long sequences of data points. For example, as shown in the graph 300 of FIG. 3, data indexed with a Hilbert curve can be grouped into discrete or relatively discrete groupings or initial clusters having relatively similar Hilbert distances d (e.g. distance along the Hilbert curve from its origin until a specific point is reached. As an example, clusters can be defined to include data points belonging to a common dominant set. A subset of the data points in the data set can be designated as a dominant set when a first overall similarity among data points within the set (e.g. internal data points) is greater than a second overall similarity between points outside of the set (e.g. external data points) and internal data points.

These extracted long sequences of points can provide useful information that allows a more intelligent choice of cluster centers with which to initialize the partitional clustering algorithm (e.g. CLARANS). For example, a median value of the Hilbert distances within a long sequence can be select as the starting center point for a cluster. Each identified long sequence can represent a cluster such that the number of centers can be at least partially based on the number of identified long sequences. Furthermore, implementations of the current subject matter can use the long sequence information to constrain further iterations of the partitional clustering algorithm such that centers for a subsequent iterations are not chosen wholly at random. Rather, the data points that are members of a long sequence can be weighted more heavily than data points that are not members of that long sequence in selecting a next cluster center for a subsequent iteration.

An improvement as described in the preceding paragraph can be realized as follows. A sequence identifier can be stored for each medoid that is chosen from a sequence. Instead of choosing a random point for swapping such medoids, more weight can be attached to the other points in the related sequence so that the algorithm chooses a relevant point with a higher probability. Similarly, less weight can be attached to the points within the other sequences as they are probably represented by the other medoids. In this way, randomness in the algorithm is preserved, but the possibility that good candidates are selected earlier and the local minimum is found with fewer iterations is improved. A maximum number of neighbors parameter maxNeighbor can be reduced for the medoids chosen from the sequences in some implementations of the current subject matter. Applying this approach to the example in FIG. 3, the medoid of the first sequence (1) can be swapped with (1, 2, 3) with a higher probability and with (13,14) with a lower probability.

Because k is set by the Hilbert curve analysis, it is possible that k may be initially set to be larger than an optimal value for a typical CLARANS analysis. For example, for many data sets, a value of approximately 5 for k can be optimal (the number 5 should be understood to be illustrative and not intended to be limiting in any way). Some data sets can yield a large number of long sequences of data points, and thereby initially result in more than a desirable number of clusters with which to initialize a partitional clustering algorithm.

To address this issue, the Hilbert curve indexing can be used. In the event that adjacent (or overlapping or intersecting, etc.) cells in the Hilbert space (e.g. those cells in cell groupings 302 and 304 shown in FIG. 3) include identified long sequences, the clusters in these two cells can optionally be combined to form a single cluster for use in the partitional clustering algorithm. This approach can advantageously be applied to relatively small clusters, e.g. those having fewer than a threshold number of data points. Larger grouping can desirably be left unmerged to avoid unnecessarily slowing the DBSCAN algorithm.

Figure 4:
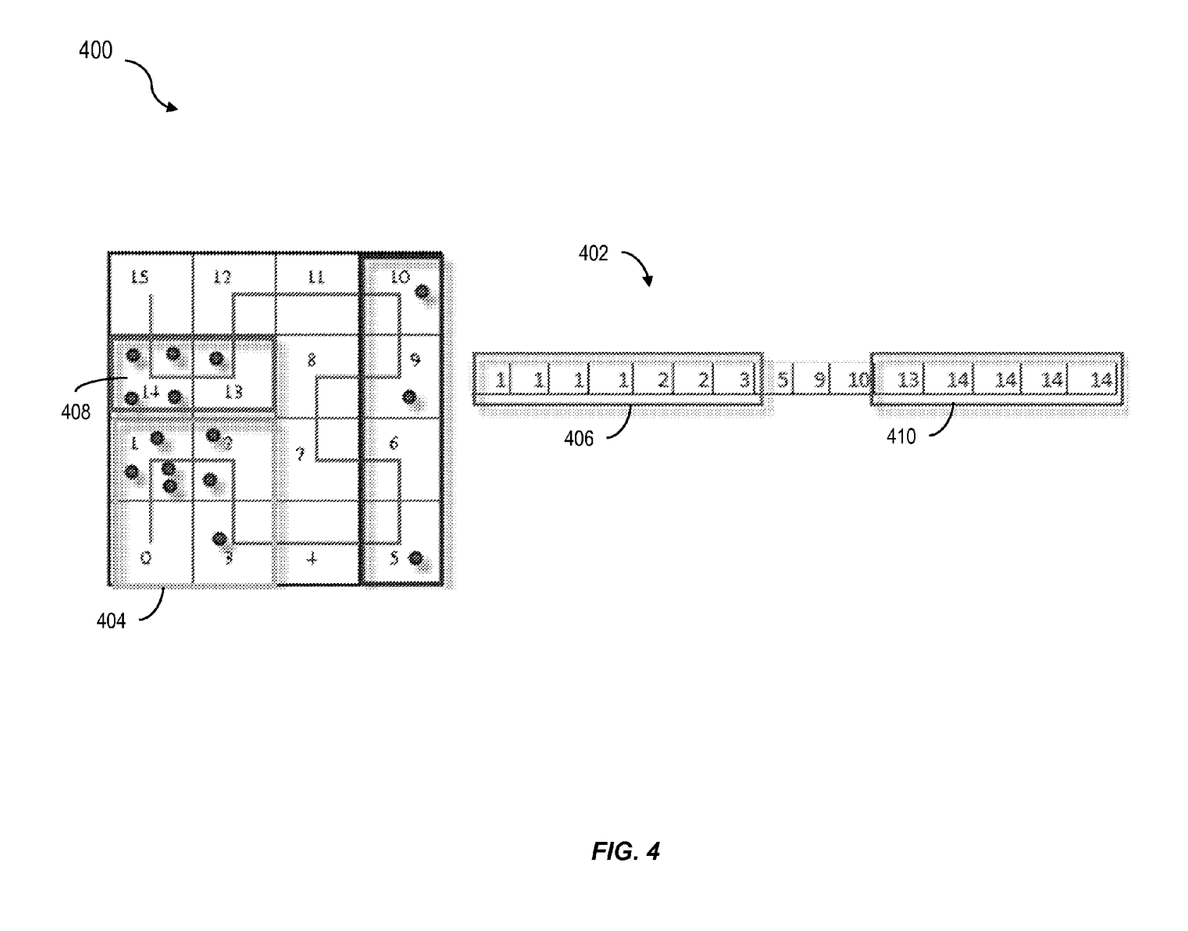
FIG. 4 shows a graph and a Hilbert distance listing illustrating merging of small clusters consistent with implementations of the current subject matter.

One example of the use of Hilbert distances to crate clusters from sequences and optionally to merge small clusters consistent with implementations of the current subject matter is illustrated in FIG. 4, which shows a graph 400 illustrating a Hilbert indexed space and a listing 402 of Hilbert distances for an indexed data set occupying the indexed space. The Hilbert indexed space in the graph 400 of FIG. 4 is divided into cells. Data points in the same cell have the same Hilbert distance as the Hilbert curve indexes points by the cell in which they appear. Data points in cells that are close to a first cell might also have similar Hilbert distances to data points in the first cell. As such, examining of the cells in the Hilbert indexed space can occur by a process in which a cell having more than a threshold amount of data points within it (e.g. having a same Hilbert distance) or a set of more than one adjacent cells (e.g. having Hilbert distances within some small integer value range) can be indicated as a long sequence. The median or other value characteristic of the center of the identified long sequence is used to initialize the CLARANS analysis.

A center value for the cluster can be selected from the Hilbert distances included within the cluster. For example, with reference to the graph 400 in FIG. 4, the cells in the box 404 in the lower left corner of the graph 400 include data points with Hilbert distances of 1 1 1 2 2 3, for which the center (e.g. the median) would be 2. The resulting long sequence is shown in the box 406 in the listing 402. The CLARANS algorithm can be initiated with the medoid of this box as 1 and this center will be optimized as CLARANS chooses alternative random center values in subsequent iterations preferentially from the values 1, 2, and 3, which are included in the cluster. As noted above, the preferential selection can be caused by a weighting factor.

While cell 14 is not included in the first cluster because it has a significantly different Hilbert distance, the data points in cell 14 are quite close to those in the box 402. Because the data points in cell 14 are not in the first cluster discussed above, but instead in a second cluster identified as including cells 13 and 14 (shown in the box 408 in the graph 400 and listed in the box 410 in the listing 402), the CLARANS algorithm would be unlikely to choose points in cells 13 and 14 as possible random median selections for the first cluster because of the optimized preference for the values 1, 2, and 3 known to be in the first cluster. While these close values can optionally be merged during the merging of the intermediate clusters after application of the DBSCAN algorithm, this would occur by an interconnectivity analysis, which can be slow and/or expensive. Accordingly, it can be advantageous to use the Hilbert indexing to check cells adjacent to other clustered cells, even if those cells do not have close Hilbert distances. In the example of FIG. 4, the cluster in the boxes 404 and 408 can be combined to form one cluster prior to application of DBSCAN.

After the CLARANS algorithm is applied to the data initially clustered based on the Hilbert indexing and identification of long sequences (and optional small cluster merging), the output includes a partitioned set of data in which the partitions have been created in an intelligent manner based on similarities and proximities in the data identified by the Hilbert curve pre-processing. DBSCAN can be applied in parallel to these partitions to produce a set of intermediate clusters.

These intermediate clusters can then been merged to create a final result. The merging can be necessary because despite the intelligent clustering used as the DBSCAN input, some clusters may still remain split as a result of the parallel processing of the CLARANS-created clusters by DBSCAN. Interconnectivity as discussed above in regard to FIG. 2 can be used to create the final results from the intermediate DBSCAN parallel results.

Figure 5:
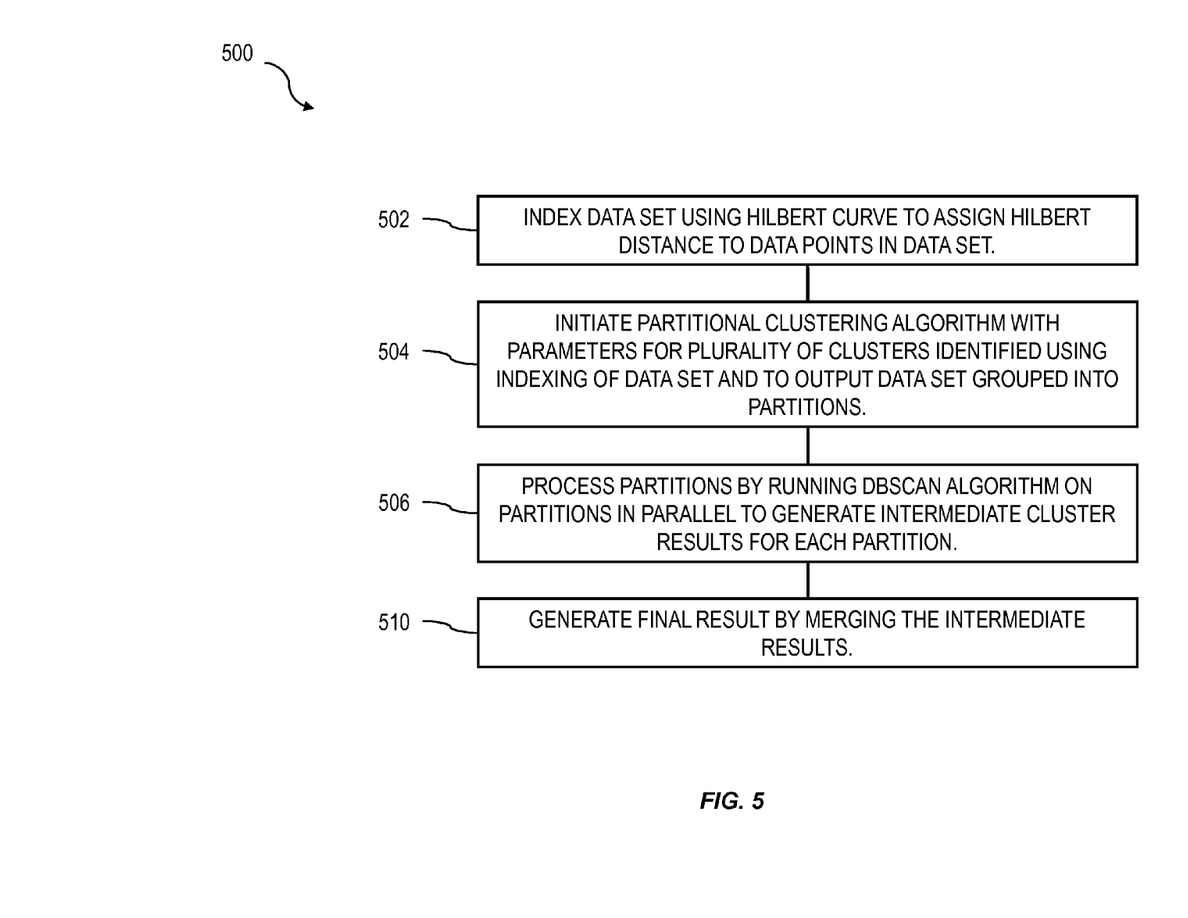
FIG. 5 shows a process flow diagram illustrating aspects of a method having one or more features consistent with implementations of the current subject matter.

FIG. 5 shows a process flow chart 500 illustrating features of a method consistent with implementations of the current subject matter. Depending on the specific implementation, one or more of the method features may be included or omitted. Such a method can be executed by one or more systems that include computer hardware. At 502, a data set is indexed using a Hilbert curve that assigns a Hilbert distance to each of a plurality of data points in the data set. A partitional clustering algorithm (e.g. CLARANS) is initiated with parameters for a plurality of clusters identified using the indexing of the data set. The partitional clustering algorithm outputs the data set grouped into a plurality of partitions at 504. At 506, the plurality of partitions are processed at least in part by running a DBSCAN algorithm on the partitions in parallel to generate intermediate cluster results for each partition, and at 510 a final result is generated at least in part by merging the intermediate results. Other features discussed herein can be part of such a method.

The approaches discussed above can be seamlessly integrated into any column store system, such as for example an in-memory high performance database system. As an illustrative, non-limiting example, the following description of an overall architecture, update handling, dictionary coding principles, and memory scan optimizations of such a system is provided with reference to FIG. 6 and FIG. 7.

Figure 6:
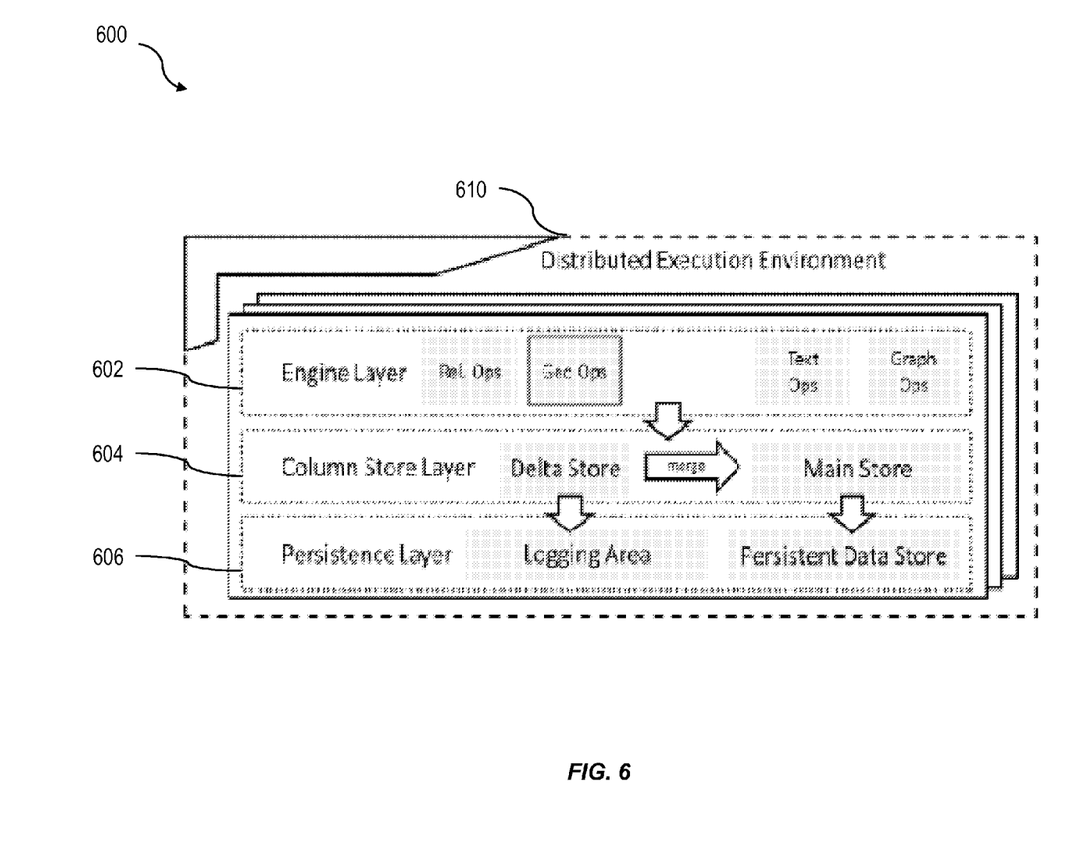
FIG. 6 shows a diagram illustrating a database environment including a column store.
Figure 7:
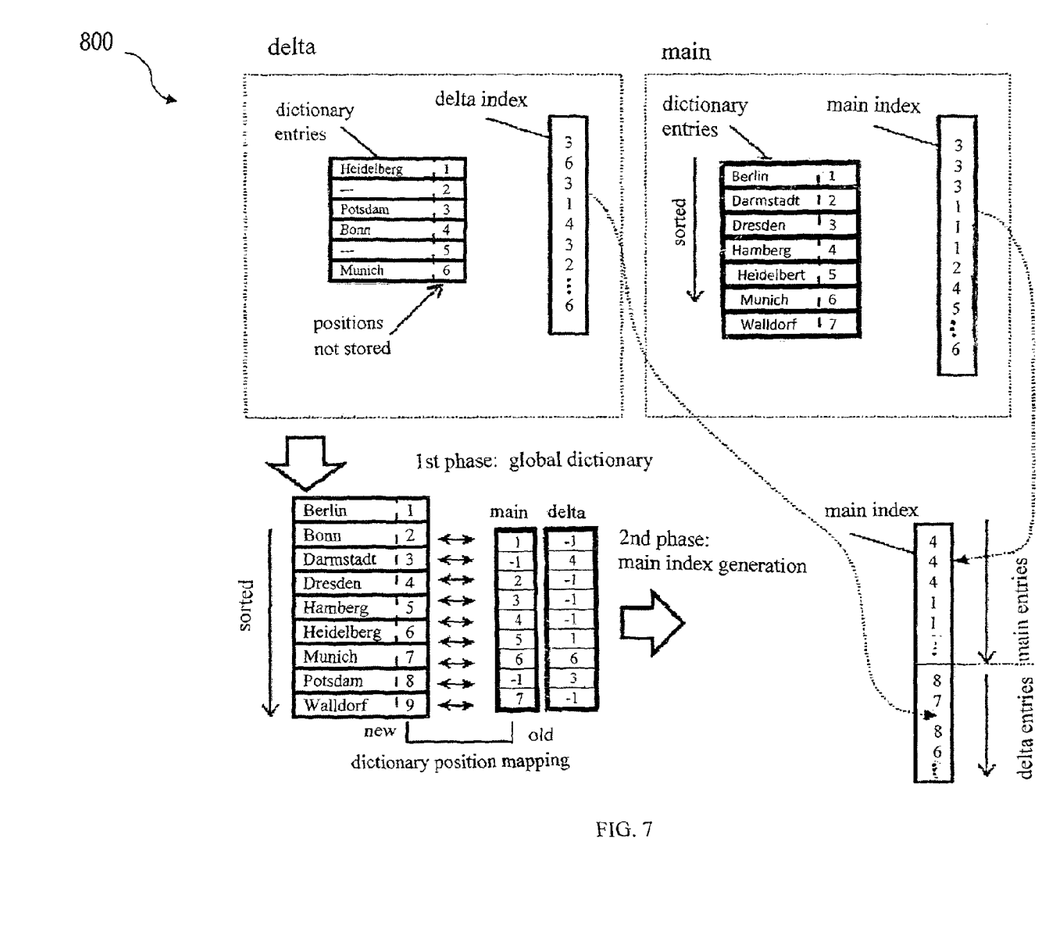
FIG. 7 shows a diagram illustrating data dictionaries and a corresponding bit compressed vector.

FIG. 6 shows a diagram 600 illustrating a layered architecture of an example of such a system, in which the database distinguishes between compile time and run time of a database request similarly to classical systems. As shown in FIG. 6, the layers can include an engine layer 602, a column store layer 604, and a persistence layer 606. Multiple components, such as a transaction manger, an authorization manager, a meta data (replication) manager, session management, etc., can be clustered around a distributed data flow execution environment 610. Within this environment, different sets of plan operators provide an abstraction from a column-oriented storage model to a corresponding data model. The engine can support a wide range of different set of operators ranging from relational operators (for the core SQL data model) to text or graph processing operators (e.g. for more elaborated and partially domain and vendor-specific data models). The general architectural design decouples the access primitives of the storage system from the different model-specific views on the data. The set of geo operators providing the functionality of geo-aware methods on top of geo-agnostic data structures complements this set of plan operators and automatically takes advantage of all functional and non-functional characteristics of the column store layer.

The column store layer 604 provides a transactionally consistent view to the engine layer 602 following the multi-version concurrency control (MVCC) principle. All operations of a query on top of this layer are transparently embedded into a sphere of control with access only to the correct underlying version of data.

The database also includes a write-optimized delta store and a read-optimized main store. All data modifications are reflected within the delta store, e.g., inserts of new versions of existing entities are represented within the delta. Deletes are either directly reflected in the delta or signaled via an additional bit-vector for the main store. As the delta grows over time, a merge process eventually moves delta entries to the read-optimized main structure. Modifications coming from the user or directly within the system can be encapsulated within the column store layer 604 and transparent for the engine layer 602.

A column store engine can apply dictionary encoding to all columns, independent of their cardinality of number of distinct values. As shown in diagram 700 of FIG. 7, a column then results in two data structures: a dictionary, which maps the user-values to Value IDs, and a bit compressed vector with Value IDs representing the columns of the original table. Due to frequent modifications and its temporary characteristics, the dictionary of the delta is unsorted. The dictionary of the read-optimized main, however, is sorted with respect to the user values. A merge then includes two phases. In a first phase, a new dictionary is constructed, consolidating the entries of the main and delta dictionaries and generating new Value IDs. In a second phase, the main bit compressed vectors are recreated by physically generating a new image of the bit compressed vector that includes the old entries (ignoring deletes) and new entries of the delta. Numerous highly optimized versions of the process exist to speed up the merge process for specific scenarios. Again, the layer above does not notice such internal and asynchronous reorganization steps. This database design can provide a basis for a seamless integration of data-model specific operators relying on core column store data structures. All updates, reorganizations, efficient scan implementations, etc. can be completely transparent for the engine layer 602 and can be exploited via well-defined scan methods. This arrangement allows for easy adoption of the techniques and transfer into other columnar systems.

Figure 8:
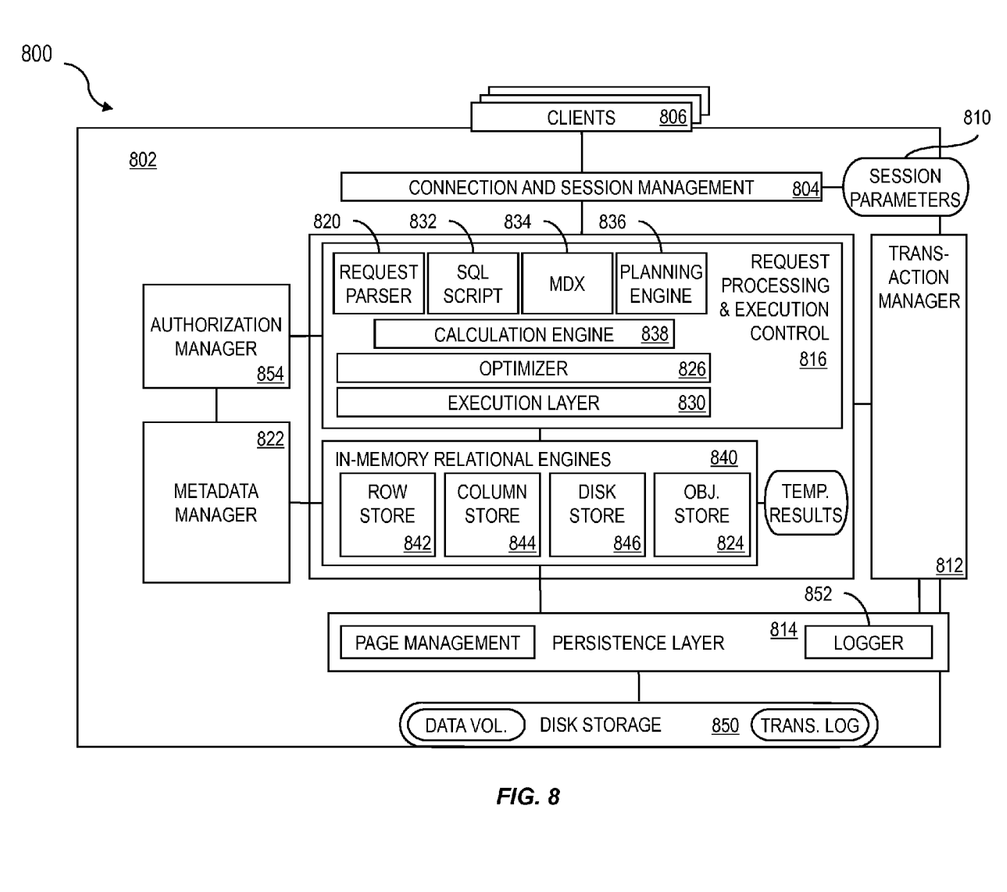
FIG. 8 shows a diagram illustrating aspects of a system showing features consistent with implementations of the current subject matter.

FIG. 8 shows a block diagram of an in-memory relational database server 800 consistent with some implementations of the current subject matter. A connection and session management component 802 of an in-memory database system 804 creates and manages sessions and connections for the database clients 806. For each session a set of parameters 810 is maintained such as for example auto commit settings or the current transaction isolation level. Once a session is established, database clients 806 can use logical (e.g. SQL) statements to communicate with the in-memory database system 804. For analytical applications the multidimensional query language MDX can also be supported.

Each statement can be processed in the context of a transaction. New sessions can be implicitly assigned to a new transaction. A transaction manager 812 can coordinate transactions, control transactional isolation, and keep track of running and closed transactions. When a transaction is committed or rolled back, the transaction manager 812 can inform the involved engines about this event so they can execute necessary actions. The transaction manager 812 can cooperate with a persistence layer to achieve atomic and durable transactions.

Requests received from the database clients 806 can be analyzed and executed by a set of request processing and execution control components 816, which can include a request parser 820 that analyses a request from a database client 806 and dispatches it to a responsible component. Transaction control statements can, for example, be forwarded to the transaction manager 812, data definition statements can be dispatched to a metadata manager 822 and object invocations can be forwarded to an in-memory object store 824. Data manipulation statements can be forwarded to an optimizer 826, which creates an optimized execution plan that is provided to an execution layer 830. The execution layer 830 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 832, which is based on side effect free functions that operate on tables using SQL queries for set processing, can be used to enable optimizations and parallelization. The MDX language 834 can be used to provide support for multidimensional queries. A planning engine 836 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 832, MDX 834, and planning engine 836 operations can be implemented using a common infrastructure called a calculation engine 838. Metadata can be accessed via the metadata manager component 822.

Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 822.

One or more relational engines 840, for example an in-memory row store 842, an in-memory column store 844, a disk-based store 846, and the in-memory object store 824 mentioned above can communicate with the request processing and execution control components 816, the metadata manager 822, and the in-memory persistence layer 814. The row store 842 and column store 844 are each relational in-memory data engines that can store data in a row-based or column-based way, respectively. Some data, such as for example tracing data, need not be kept in memory all the time. The disk-based store 846 can handle such data. Data in the disk-based store 146 can be primarily stored in disk storage 850 and only moved to memory buffers (e.g. the persistence layer 814) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 814 can be responsible for durability and atomicity of transactions and can ensure that the database is restored to the most recent committed state after a restart and that transactions are either completely executed or completely undone. To achieve this goal in an efficient way, the persistence layer 814 can use a combination of write-ahead logs, shadow paging and save points. The persistence layer 814 can offer interfaces for writing and reading data and can also contain a logger 852 that manages the transaction log. Log entries can be written implicitly by the persistence layer 814 when data are written via a persistence interface or explicitly by using a log interface.

An authorization manager 854 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

indexing a data set using a Hilbert curve that assigns a Hilbert distance to each of a plurality of data points in the data set;

initiating a partitional clustering algorithm with parameters for a plurality of clusters identified using the indexing of the data set, the partitional clustering algorithm outputting the data set grouped into a plurality of partitions, the parameters comprising one or more cluster center values selected based on one or more sequences identified from the Hilbert distances;

determining the one or more cluster center values, the determining comprising grouping the Hilbert distances for the plurality of points into the plurality of clusters, identifying one or more sequences of Hilbert distances as members of a cluster of the plurality of clusters, and choosing a cluster center value for the cluster based on a median of the Hilbert distances in the cluster;

constraining the partitional clustering algorithm to randomly choose a new cluster center value for the cluster with a greater preference for the new cluster value to be within the grouped Hilbert distances for the cluster;

processing the plurality of partitions, the processing comprising running a DBSCAN algorithm on the partitions in parallel to generate intermediate cluster results for each partition; and generating a final result, the generating comprising merging the intermediate results.

2. The computer program product of claim 1, wherein the operations further comprise merging two or more of the plurality of clusters prior to the initiating of the partitional clustering algorithm, the merging comprising identifying data points in adjacent cells of the indexed data set.

3. The computer program product of claim 1, wherein the partitional clustering algorithm comprises a CLARANS algorithm.

4. A system comprising:

computer hardware configured to perform operations comprising:

indexing a data set using a Hilbert curve that assigns a Hilbert distance to each of a plurality of data points in the data set;

initiating a partitional clustering algorithm with parameters for a plurality of clusters identified using the indexing of the data set, the partitional clustering algorithm outputting the data set grouped into a plurality of partitions, the parameters comprising one or more cluster center values selected based on one or more sequences identified from the Hilbert distances;

determining the one or more cluster center values, the determining comprising grouping the Hilbert distances for the plurality of points into the plurality of clusters, identifying one or more sequences of Hilbert distances as members of a cluster of the plurality of clusters, and choosing a cluster center value for the cluster based on a median of the Hilbert distances in the cluster;

constraining the partitional clustering algorithm to randomly choose a new cluster center value for the cluster with a greater preference for the new cluster value to be within the grouped Hilbert distances for the cluster;

processing the plurality of partitions, the processing comprising running a DBSCAN algorithm on the partitions in parallel to generate intermediate cluster results for each partition; and generating a final result, the generating comprising merging the intermediate results.

5. The system of claim 4, wherein the operations further comprise merging two or more of the plurality of clusters prior to the initiating of the partitional clustering algorithm, the merging comprising identifying data points in adjacent cells of the indexed data set.

6. The system of claim 4, wherein the partitional clustering algorithm comprises a CLARANS algorithm.

7. The system of claim 4, wherein the computer hardware comprises:

a programmable processor; and a computer readable medium storing instructions that, when executed by the programmable processor, cause the programmable processor to perform at least some of the operations.

8. A computer implemented method comprising:

indexing a data set using a Hilbert curve that assigns a Hilbert distance to each of a plurality of data points in the data set;

initiating a partitional clustering algorithm with parameters for a plurality of clusters identified using the indexing of the data set, the partitional clustering algorithm outputting the data set grouped into a plurality of partitions, the parameters comprising one or more cluster center values selected based on one or more sequences identified from the Hilbert distances;

determining the one or more cluster center values, the determining comprising grouping the Hilbert distances for the plurality of points into the plurality of clusters, identifying one or more sequences of Hilbert distances as members of a cluster of the plurality of clusters, and choosing a cluster center value for the cluster based on a median of the Hilbert distances in the cluster;

constraining the partitional clustering algorithm to randomly choose a new cluster center value for the cluster with a greater preference for the new cluster value to be within the grouped Hilbert distances for the cluster;

processing the plurality of partitions, the processing comprising running a DBSCAN algorithm on the partitions in parallel to generate intermediate cluster results for each partition; and generating a final result, the generating comprising merging the intermediate results.

9. The computer implemented method of claim 8, further comprising merging two or more of the plurality of clusters prior to the initiating of the partitional clustering algorithm, the merging comprising identifying data points in adjacent cells of the indexed data set.

10. The computer implemented method of claim 8, wherein the partitional clustering algorithm comprises a CLARANS algorithm.

11. The computer implemented method of claim 8, wherein the indexing, the initiating, the processing, and the generating are performed by at least one system comprising computer hardware.

* * * * *